UNITED STATES PATENT OFFICE.

WATSON KARR, OF FROSTBURG, MARYLAND.

IMPROVEMENT IN PROCESSES FOR PREVENTING THE ACCUMULATION OF CARBON IN RETORTS.

Specification forming part of Letters Patent No. 187,866, dated February 27, 1877; reissue No. 7,739, dated June 12, 1877; application filed May 16, 1877.

*To all whom it may concern:*

Be it known that I, WATSON KARR, of Frostburg, in the county of Alleghany and State of Maryland, have invented a new and useful Improvement in the Manufacture of Illuminating-Gas; and I do hereby declare that the following is a full, clear, and exact description of the same.

Mineral coal is commonly classed as anthracite, bituminous, and semi-bituminous, according to the proportion of bituminous substances present.

The bituminous variety is used for the production of illuminating-gas; but, for a reason hereinafter stated, in the process of distillation, carbon is deposited on the roof and sides of the retort. This deposit is increased as the gas-making process continues until the cubical capacity and the inner radiating-surface of the retort are diminished to such an extent as to render its use no longer practicable. This deposit requires to be removed by mechanical means, an operation which, aside from the matter of expense for the labor involved, and also in consequence of the temporary disuse of the retort, results in injury to the latter, and in time renders it unavailable for its function.

It is the chief object of my invention to avoid this and other disadvantages attending or incident to the ordinary process of gas manufacture; and this I effect by preventing the deposition or accumulation of carbon on the inner surface of the retort by charging the latter with a combination of bituminous and semi-bituminous coals in the manner I will now proceed to describe.

The practical operation is as follows: The retort being at working-heat, I first place a given quantity of semi-bituminous coal in the retort, and then complete the charge with bituminous coal. In other words, the semi-bituminous coal is to be placed in rear of the bituminous coal.

The principle of the invention is explainable as follows: In the distillation of gases from the bituminous variety of coal the products evolved during the first part of the process are the heavy hydrocarbon gases, together with a greater or less quantity of free carbon, most of which is deposited by reason of the fact that an insufficient amount of hydrogen is at this time present to combine with and utilize the same in the formation of gas. The last products evolved in the process of distillation contain a sufficient proportion of light carbureted-hydrogen gas ($C_2H_4$)—in which the hydrogen is in excess—to prevent the further deposition of carbon; but, inasmuch as the free carbon first given off is deposited in crystalline form before the evolution of the excessive hydrogen of the light carbureted hydrogen ($C_2H_4$) takes place, the excessive carbon of the first part of the distillation and the excessive hydrogen of the last part of the distillation are not associated simultaneously with their evolution, and the carbon not being in a nascent state, they do not, therefore, chemically unite to form a hydrocarbon, but the gas produced is charged with an excessive quantity of hydrogen, which detracts from its illuminating properties, while at the same time the retort is clogged with a deposit of carbon, which prevents the best utilization of the coal, and also to a large extent obstructs the transmission of heat to the materials in the retort.

To obviate this difficulty I employ two kinds of coal charged simultaneously. One of these coals (the bituminous) evolves, by reason of its richness, the heavy carbureted hydrogen, ($C_4H_4$,) and gives at the same time a deposit of carbon. The other coal, (the semi-bituminous,) being less rich in carbon, evolves from the start only light carbureted hydrogen, ($C_2H_4$.) in which hydrogen is in excess. Now, by charging the retort with these two coals at once, it will be seen that we have two coals evolving simultaneously and from the start, the one carbon in excess and the other hydrogen in excess; and inasmuch as the evolution of the free carbon and the excessive hydrogen—*i. e.*, the two extra equivalents of the light hydrocarbon—takes place together and simultaneously, their nascent condition and intimate gaseous association compels them to unite to form a hydrocarbon, which may be illustrated thus:

Bituminous coal $=C_4H_4+4C$; semi-bituminous coal $=2(C_2H_4)$; $C_4H_4+4C\ 2(C_2H_4)$ (generated simultaneously) $=3(C_4H_4)$. The product is a permanent and stable illuminating-gas, but little liable to depreciation.

It is evident that the result attained is largely due to the relative position or local relation in the retort of the two kinds of coal used, since the light product eliminated from the semi-bituminous coal placed at the back end of the retort, in passing forward to the stand-pipe, mingles with the heavy hydrocarbon vapors generated from the bituminous coal, and also comes in contact with any carbon particles that may have been deposited on the surface of the retort.

The general results of the process are, first, a greater volume of illuminating-gas is produced from the combined bituminous and semi-bituminous coals than can be procured from a like quantity of bituminous coal taken alone; second, fuel is economized, since the retort, being always free from carbon, has only its own thickness intervening between the fire of the furnace and the coal to be distilled; third, less time is required for distilling a charge, since the inner radiating-surface of the retort is at its maximum when free from carbon; fourth, since the mechanical removal of carbon injures the retort, its durability is increased by dispensing with the necessity of that operation; fifth, the expense of the removing the carbon deposit and the loss entailed by temporary disuse of the retort are avoided; sixth, the precipitation of the heavy hydrocarbon in the form of coal-tar being mainly due to the absence of a sufficient proportion of light carbureted hydrogen in combination, my process, by bringing the two in contact simultaneously, to a considerable extent prevents the loss from this source.

The following may be laid down as a general rule governing the proportion of semi-bituminous coal to be used, viz., that, as the specific gravity of the hydrocarbon vapors distilled from the bituminous coal increases, the proportion of semi-bituminous coal is to be increased, and conversely. In other words, the quantity of the semi-bituminous coal must be varied according to the candle-power of the gas produced by the bituminous coal.

The following table illustrates the application of the rule in the case of certain well-known varieties of coal:

| Bituminous. | Candle-power. | Semi-bituminous. | Candle-power. | Yield (in cubic feet) per pound of coal. | Proportion, by weight, in 100 parts. |
|---|---|---|---|---|---|
| West Virginia coal | 17 | Cumberland. | 7.50 | 4.40 | 14 to 20 |
| Youghegliany coal | 16 | ....do ..... | 7.50 | 4.40 | 12 to 18 |
| Cannel-coal ..... | 40 | ....do ..... | 7.50 | 4.40 | 50 to 67 |

The appearance of the retort when the charge is withdrawn is a certain test, indicating, by the presence or absence of carbon formations, a mean proportion of the coals to be used by a slight increase or decrease of the semi-bituminous variety.

Having thus described my invention, what I claim is—

In the manufacture of illuminating-gas, the process of preventing the accumulation of carbon in retorts by combining bituminous and semi-bituminous coals, substantially in the manner described.

The above specification of my invention signed by me this 11th day of May, 1877.

WATSON KARR.

Witnesses:
AMOS W. HART,
CHAS. A. PETTIT.